United States Patent [19]

Hanna

[11] Patent Number: 5,703,201
[45] Date of Patent: Dec. 30, 1997

[54] CATALYST FOR POLYMERIZATION OF POLYKETONE FORMED BY TREATMENT WITH CARBON MONOXIDE AND OLEFIN

[75] Inventor: Paul K. Hanna, East Windsor, N.J.

[73] Assignee: Akzo Nobel nv, Arnhem, Netherlands

[21] Appl. No.: 541,835

[22] Filed: Oct. 10, 1995

[51] Int. Cl.$^6$ .................................................. C08G 67/02
[52] U.S. Cl. ...................... 528/392; 528/425; 502/203; 502/333
[58] Field of Search ................... 528/392, 425; 502/333, 203

[56] References Cited

U.S. PATENT DOCUMENTS

| | | | |
|---|---|---|---|
| 5,061,785 | 10/1991 | Drent | 528/392 |
| 5,066,778 | 11/1991 | Van Duersen et al. | 528/392 |
| 5,091,507 | 2/1992 | Van Leeuwen et al. | 528/392 |
| 5,187,258 | 2/1993 | Smith | 528/392 |
| 5,216,120 | 6/1993 | Drent et al. | 528/392 |
| 5,225,386 | 7/1993 | Van Leeuwen et al. | 502/162 |
| 5,352,767 | 10/1994 | Chien | 528/392 |
| 5,494,998 | 2/1996 | Hanna et al. | 528/892 |

FOREIGN PATENT DOCUMENTS

| | | | |
|---|---|---|---|
| 590942 | 4/1994 | European Pat. Off. | C08G 67/02 |
| 619335 | 10/1994 | European Pat. Off. | C08G 67/02 |

OTHER PUBLICATIONS

Z. Jiang et al., "Synthesis of Chiral Alternating α-Olefin--Carbon Monoxide Copolymers", Polymer Preprints, vol. 35, No. 1, Mar. 1994, pp. 676–677.

T-W. Lai et al., "Palladium(II)-Catalyzed Copolymerization of Carbon Monoxide with Ethylene. Direct Evidence for a Single Mode of Chain Growth", Organometallics 1984, 3, 866–870.

E. Drent et al., "Efficient Palladium Catalysts for the Copolymerization of Carbon Monoxide with Olefins to Produce Perfectly Alternating Polyketones", Journal of Organometallic Chemistry, 417 (1991), 235–251.

A. sen, "Mechanistic Aspects of Metal–Catalyzed Alternating Copolymerization of Olefins with Carbon Monoxide", Acc. Chem. Res. 1993,26,303–310.

*Primary Examiner*—James J. Seidleck
*Assistant Examiner*—Duc Truong
*Attorney, Agent, or Firm*—Richard P. Fennelly; Louis A. Morris

[57] ABSTRACT

A process for the synthesis of a catalyst for the polymerization of carbon monoxide and at least one olefin which comprises treating a mixture of a compound of palladium, such as tetrakis(acetonitrile) palladium, and a Lewis acid anion, such as a fluoride of a metal selected from Group III to Group V of the Periodic Table (e.g., boron trifluoride), with carbon monoxide and an olefin followed by reaction of the resulting composition with a bidentate ligand reagent, such as a 1,3-bis(diphenyl-phosphino) alkane (e.g., 1,3-bis (diphenyl-phosphino) propane).

18 Claims, No Drawings

CATALYST FOR POLYMERIZATION OF POLYKETONE FORMED BY TREATMENT WITH CARBON MONOXIDE AND OLEFIN

BACKGROUND OF THE INVENTION

A variety of catalysts for the polymerization of polyketone polymers have been reported in the scientific literature. One such system comprises: a compound of palladium, such as tetrakis(acetonitrile) palladium; an acidic component comprising a mixture of Lewis acid (e.g., boron trifluoride) and Bronsted acid (e.g., hydrogen fluoride); and a bidentate ligand reagent of phosphorus, nitrogen or sulfur, e.g., a 1,3-bis(diphenyl-phosphino) alkane (see U.S. Pat. No. 5,216,120 to E. Drent et al).

U.S. Pat. No. 5,187,258 to K. G. Smith discloses the use of a catalyst comprising an anion prepared by reacting a substituted salicylic acid and boric acid.

J. C. W. Chien describes the Use of such anions as boron tetrafluoride, boron tetraphenyl, and boron tetra (pentafluoroboron) in the polymerization of carbon monoxide and an α-olefin.

European Patent Publication No. 619,335 describes the use of boron hydrocarbyl anions in a catalyst for the polymerization of carbon monoxide and an olefin.

A. Sen of The Pennsylvania State University has used a variant of the foregoing type of system described by Drent in which the Lewis acid anion component is used alone and is, preferably, boron tetrafluoride. Descriptions of this system are contained in: Sen et al., Polymer Preprints 35, 1, March 1994, pp. 676–677; and Organometallics 1984, 3, 866–870 wherein Sen indicates (on page 867 that the cationic palladium (II) compound would be rapidly reduced to palladium metal, presumably rendering the catalyst system inert, if treated with carbon monoxide.

SUMMARY OF THE INVENTION

The present invention relates to a process for the synthesis of a catalyst for the polymerization of carbon monoxide and at least one olefin which comprises treating a mixture of a compound of palladium, such as tetrakis(acetonitrile) palladium, and an anion for a polyketone catalyst, such as a Lewis acid anion, e.g., a fluoride of a metal selected from Group III to Group V of the Periodic Table (e.g., boron tetrafluoride), with carbon monoxide and an olefin followed by reaction of the resulting composition with a bidentate ligand reagent, such as a 1,3-bis(diphenyl-phosphino) alkane (e.g., 1,3-bis(diphenyl-phosphino) propane).

The present invention also relates a process for the polymerization of carbon monoxide and at least one olefin which comprises the use of a catalyst comprising a compound of palladium, a bidentate ligand reagent, and an anion, for example, of the type used with catalysts to polymerize carbon monoxide and an olefin, such as a fluoride of a metal selected from Group III to Group V of the Periodic Table (e.g., boron tetrafluoride) formed by the process described in the preceding paragraph.

DESCRIPTION OF THE PREFERRED EMBODIMENTS

The type of palladium compound that can be used in accordance with the present invention includes the palladium carboxylates, such as palladium acetate, palladium propionate, palladium butyrate, and palladium hexanoate, and ionic palladium (II) salts, such as tetrakis(acetonitrile) palladium tetrafluroborate.

The type of anion which can be selected for use includes those known to persons of ordinary skill in the art as useful in catalysts for forming polyketones from carbon monoxide and an olefin. Lewis acid anion includes the halides, such as the fluorides, of a metal selected from Group III to Group V of the Periodic Table (e.g., boron tetrafluoride).

In accordance with the present invention, a mixture of these two preceding reagents, preferably in a molar ratio of 1:2, are treated with carbon monoxide and an olefin (such as ethylene, propylene, or mixture thereof) prior to contact with the bidentate ligand reagent, which will be described in more detail herein below. It is within the contemplation of this invention to conduct the treatment by using carbon monoxide first followed by the olefin (which is preferred), or vice-versa. This treatment preferably takes place in a solvent which is a strongly coordinating, polar and aprotic solvent, such as acetonitrile. When the preferred mixture of tetrakis-(acetonitrile) palladium and boron tetrafluoride is thus treated a light orange color is noted.

After treatment of the compound of palladium and Lewis acid anion, as hereinbefore described, the selected bidentate ligand reagent is contacted with the resulting reaction product. This ligand can be one containing phosphorus, nitrogen, or sulfur as described in U.S. Pat. No., 5,216,120 at Col. 4, lines 9 to 68 which are incorporated herein by reference. Preferred ligand contain phosphorus and are 1,3-bis (diphenyl-phosphino) alkanes (e.g., 1,3-bis(diphenyl-phosphino) propane, which is preferred). The amount of such ligand preferably ranges from about 0.75 to about 1.5 mole per mole of palladium. Treatment with the preferred type of ligand has cause the light orange color of the material (before treatment) to change to dark red and then to dark green.

The present invention, in another embodiment, also relates a process for the polymerization of carbon monoxide and at least one olefin which comprises the use of a catalyst comprising a compound of palladium, a bidentate ligand reagent, and an anion, for example, the type used with catalysts to polymerize carbon monoxide and an olefin, such as a fluride of a metal selected from Group III to Group V of the Periodic Table (e.g., boron tetrafluoride). Other anions can be used including aluminoxane or the non-coordinating, tetrasubstituted anions containing boron (such as the boron (tetraphenyl) or boron tetra(pentafluorphenyl anions) described and claimed in U.S. Pat. No. 5,494,998.

The present invention is further illustrated by the Examples which follow.

COMPARATIVE EXAMPLE 1

This Example illustrates the preparation of the type of catalyst described in European Patent Publication No. 301, 664 to Shell (hereinafter referred to as the "Shell" catalyst).

A flask equipped with a stir bar had the following reagents added to it: palladium acetate (0.055 gm); p-toluenesulfonic acid (0.11 gm); and 1,3-bis(diphenylphosphino)propane (0.105 gm). To this mixture was then added 10 ml of dry acetone and 7 ml of dry acetonitrile. The mixture was stirred for ten minutes at room temperature and was then warmed to 50° C. for five minutes. This resulted in a clear yellow solution in the flask. This solution was cooled to 30° C., and the solvent was removed under vacuum. The resulting product was a yellow solid which was dissolved in 5 ml of dry acetone for injection into the autoclave. The solution was then injected into the autoclave which contained 300 ml of methanol and 300 ml of nitromethane at 50° C. and was pressurized with a 1:1 vol:vol mixture of carbon monoxide and ethylene to 380 psig.

COMPARATIVE EXAMPLE 2

This Example describes the process used to form the catalyst described in Sen et al., Polymer Preprints 35, 1, March 1994, pp. 676–677 (hereinafter referred to as the "Sen" catalyst).

Tetrakis(acetonitrile) palladium tetrafluoroborate (0.11 gm) was dissolved in 5 ml of acetonitrile and 1,3-bis (diphenyl-phosphino) propane (0.105 gm) was dissolved separately in 5 ml of acetonitrile. The phosphine-containing solution was then added to the palladium-containing solution. The resulting mixture was injected into the autoclave which contained 300 ml of methanol and 300 ml of nitromethane at 50° C. and was pressurized with a 1:1 vol:vol mixture of carbon monoxide and ethylene to 380 psig.

EXAMPLE 3

This Example describes the process used to form the catalyst of the present invention which is a modification of the process for preparing the Sen catalyst.

Tetrakis(acetonitrile) palladium tetrafluoroborate (0.11 gm) was dissolved in 5 ml of acetonitrile and 1,3-bis (diphenyl-phosphino) propane (0.105 gm) was dissolved separately in 5 ml of acetonitrile. Then, 40 ml of a 1:1 vol:vol mixture of carbon monoxide and ethylene was bubbled through the palladium-containing solution, turning it from a light yellow color to an orange color. The phosphine-containing solution was then added to the palladium-containing solution which turned dark red and then dark green. The resulting mixture was injected into the autoclave which contained 300 ml of methanol and 300 ml of nitromethane at 50° C. and was pressurized with a 1:1 vol:vol mixture of carbon monoxide and ethylene to 380 psig.

EXAMPLE 4

This Example presents the results of polymerization runs using the above-described catalysts at 50° C., and a pressure of 26 bar.

| Catalyst | Benzo-quinone (eq.) | Wt. of Polymer (g) | Bar/hr 15/60/120 (min) | Rate at 15 min* | % Rate Retention** | LVN |
|---|---|---|---|---|---|---|
| Shell | 0 | 24.0 | 8/7/6 | 400 | 85/75 | 1.9 |
| Sen | 4 | 3.5 | 3.7/1.2/0.4 | 180 | 33/11 | — |
| Invention | 4 | 43.0 | 22/27/20 | 1100 | 108/91 | 2.6 |

*expressed as gm polyketone/gm Pd/hr.
**expressed as retention of rate at one hour (before slash) and at two hours (after slash)

The foregoing Examples have been presented to illustrate certain embodiments of the present invention and, for that reason, should not be construed in a limiting sense. The scope of protection sought is set forth in the claims which follow.

I claim:

1. A process for the synthesis of a catalyst for the polymerization of carbon monoxide and at least one olefin which comprises treating a mixture of a compound of palladium and an anion, which is effective in the catalyst for such polymerization, with carbon monoxide and an olefin followed by reaction of the resulting composition with a bidentate ligand reagent.

2. A process as claimed in claim 1 wherein the anion is a Lewis acid anion and is a fluoride of a metal selected from Group III to Group V of the Periodic Table.

3. A process as claimed in claim 1 wherein the Lewis acid anion is boron tetrafluoride.

4. A process as claimed in claim 1 wherein the compound of palladium is tetrakis(acetonitrile) palladium.

5. A process as claimed in claim 1 wherein the compound of palladium is tetrakis(acetonitrile) palladium and the Lewis acid anion is boron tetrafluoride.

6. A process as claimed in claim 1 wherein the bidentate ligand reagent is a 1,3-bis(diphenyl-phosphino) alkane.

7. A process as claimed in claim 1 wherein the compound of palladium is tetrakis(acetonitrile) palladium and the Lewis acid anion is boron tetrafluoride.

8. A process as claimed in claim 1 wherein the bidentate ligand reagent is a 1,3-bis(diphenyl-phosphino) alkane.

9. A process as claimed in claim 1 wherein the compound of palladium is tetrakis(acetonitrile) palladium, the Lewis acid anion is boron tetrafluoride, and the bidentate ligand reagent is a 1,3-bis(diphenyl-phosphino) propane.

10. A process for the polymerization of carbon monoxide and at least one olefin which comprises the use of a catalyst, which comprises a compound of palladium, a bidentate ligand reagent, and an anion, which is effective in the catalyst for such polymerization, said catalyst being formed by treating the compound of palladium and the anion of the acid with carbon monoxide and an olefin followed by reaction of the resulting composition with a bidentate ligand reagent.

11. A process as claimed in claim 10 wherein the anion is a Lewis acid anion and is a fluoride of a metal selected from Group III to Group V of the Periodic Table.

12. A process as claimed in claim 10 wherein the Lewis acid anion is boron tetrafluoride.

13. A process as claimed in claim 10 wherein the compound of palladium is tetrakis(acetonitrile) palladium.

14. A process as claimed in claim 10 wherein the compound of palladium is tetrakis(acetonitrile) palladium and the Lewis acid anion is boron trifluoride.

15. A process as claimed in claim 10 wherein the bidentate ligand reagent is a 1,3-bis(diphenyl-phosphino) alkane.

16. A process as claimed in claim 10 wherein the compound of palladium is tetrakis(acetonitrile) palladium and the Lewis acid anion is boron trifluoride.

17. A process as claimed in claim 10 wherein the bidentate ligand reagent is a 1,3-bis(diphenyl-phosphino) alkane.

18. A process as claimed in claim 10 wherein the compound of palladium is tetrakis(acetonitrile) palladium, the Lewis acid anion is boron tetrafluoride, and the bidentate ligand reagent is a 1,3-bis(diphenyl-phosphino) propane.

* * * * *